United States Patent [19]

Davis, Jr. et al.

[11] 3,831,116

[45] Aug. 20, 1974

[54] SURFACE ACOUSTIC WAVE FILTER

[75] Inventors: Luther Davis, Jr., Wayland; Melvin G. Holland, Lexington, both of Mass.

[73] Assignee: Raytheon Company, Lexington, Mass.

[22] Filed: Apr. 9, 1973

[21] Appl. No.: 349,601

[52] U.S. Cl. ................ 333/72, 330/5.5, 331/107 A, 331/155, 333/30 R

[51] Int. Cl. ........ H03h 9/26, H03h 9/32, H03b 5/30

[58] Field of Search ............. 333/30 R, 72; 330/5.5; 331/107 A, 155

[56] References Cited

UNITED STATES PATENTS

| | | | |
|---|---|---|---|
| 2,672,590 | 3/1954 | McSkimin | 333/72 X |
| 3,479,572 | 11/1969 | Pokorny | 333/30 R X |
| 3,548,306 | 12/1970 | Whitehouse | 333/30 X |
| 3,582,834 | 6/1971 | Evans | 333/72 X |
| 3,582,838 | 6/1971 | DeVries | 333/72 |
| 3,745,485 | 7/1973 | McShan | 333/30 R X |
| 3,754,192 | 8/1973 | Palfreeman | 330/5.5 |
| 3,755,761 | 8/1973 | Hartmann | 333/70 T |

OTHER PUBLICATIONS

Bond et al.–"Wrap-Around Surface-Wave Delay Lines" in Electronics Letters Feb. 11, 1971, Vol. 7, No. 3; pp. 79–80.

*Primary Examiner*—James W. Lawrence
*Assistant Examiner*—Marvin Nussbaum
*Attorney, Agent, or Firm*—Herbert W. Arnold; Joseph D. Pannone; Milton D. Bartlett

[57] ABSTRACT

An acoustic wave filter is disclosed in which a number of input/output transducers are mounted on a piezoelectric substrate upon which surface waves may propagate in a continuous manner. The substrate may consist of either a continuous surface where the surface waves can circulate or a planar substrate with reflectors at either end of the substrate so that the waves will reflect back and forth from end to end. With such a device, using a single input transducer and a plurality of output transducers or alternatively a plurality of input transducers and a single output transducer, a narrow-band filter may be realized. In the preferred embodiment, the input or output transducers may be switched in and out thereby switching in and out different frequency response peaks. The device may be embodied as a switchable frequency selection device in a multichannel transceiver.

13 Claims, 7 Drawing Figures

SURFACE ACOUSTIC WAVE FILTER

BACKGROUND OF THE INVENTION

Some narrow-band acoustic wave filter devices have been known in the past. However, these devices have usually required large numbers of fingers in both the input and output transducers. For example, for a 50 kHz bandwidth at 100 MHz, approximately 2000 fingers must be used in each of the transducers. Such a large number of fingers gave rise to numerous problems such as a surface wave would have to pass under many fingers of both transducers in passing from end to end along the device. The large number of fingers disturbed the acoustic impedance of the device and, hence, modified the propagation characteristics of the waves which traveled under the transducers. Such devices have proved difficult to manufacture and somewhat difficult to use because of the large numbers of fingers.

Later attempts to construct narrow-band acoustic wave filters have included the use of different transducer structures for each of the input and output transducers. In these devices, the combs which make up the overall transducers are located at different spacings in the receiving and transmitting transducers. Thus, when the input transducer is excited with a continuous waveform, the waves received at the output transducer will add at certain frequencies and cancel at other frequencies. With these devices, to obtain a single peak required quite complicated transducer structures for each of the transducers. Also, the fabrication of the device was complicated in that different irregularly spaced transducer structures had to be used. It was also not possible to use such a device in an oscillator section of a transmitter or receiver where numerous frequencies must be selected because the device had to be redesigned for each new frequency in that the actual finger spacing had to be changed to vary the frequency.

Transceivers which have crystal stabilizied oscillators for either transmitting or receiving modes have generally had to employ separate crystals for each frequency on which the device was to operate. Frequency doublers and the like had to be used since a crystal cut to the desired frequency would have to be impractically thin at VHF frequencies. The cost of such an oscillator control scheme became exceedingly high as the number of channels in the device was increased. For example, in the marine radio bands in the VHF range, upwards of 50 channels are presently authorized while for the 27 MHz Citizens Band Service, there are presently 23 channels authorized. Especially, on the Citizens Band radios it is deemed desirable to be able to operate on any of the allocated frequencies at any time merely by changing a switch position.

Other schemes which did not use the multiplicity of crystals used a single crystal plus frequency synthesizing techniques. All of these techniques were capable of producing multichannel operation capabilities; however, these circuits were quite complicated, cumbersome and expensive to fabricate.

SUMMARY OF THE INVENTION

It is thus an object of the present invention to produce a narrow-band surface wave device capable of operating at VHF frequencies.

It is also an object of the present invention to produce a surface wave narrow-band filter device which uses a relatively small number of fingers in each of the transducers.

Furthermore, it is an object of the present invention to produce an externally switchable frequency source which does not use frequency doublers or the like.

These and other objects of the present invention may be met by providing the combination of means for repetitively propagating one or more waves and means for producing an output in response to the waves at selected frequencies of the waves. The propagating means can include any material which will sustain wave propagation, including both surface waves and bulk waves, and in a preferred embodiment is a piezoelectric material. The piezoelectric material in the case of surface waves has at least one surface upon which the waves may propagate. There are at least two ways in which the surface may be arranged. First, it may be a curved surface in the form of a circle or ellipse with the surface perpendicular to the plane of the circle or ellipse so that the waves may continuously circulate on the surface. Secondly, it may be a planar surface with reflectors located at each end of the surface at the end of the wave travel so that the waves may reflect back and forth between the reflectors. Input and output transducer means are provided to couple electrical signals into the piezoelectric material as propagating waves and out again as electrical signals. These transducers are each preferably interleaved sets of conductive fingers which may be metal or semiconductor material. To produce the desired frequency response peaks, the input and output transducers are positioned relative to one another so that, summing over all input and output transducers, only signals whose frequencies enable them to be in phase at the selected frequency are coupled between input and output transducers. Both ones of the input and output transducers may each be switchably connected to their respective input and output circuits so that different preselected frequency peaks may be switched in and out as desired. The device is thus used to advantage in a frequency determining circuit which may be employed in a radio receiver or transmitting circuit. An amplifier in the feedback path may be included as part of the frequency determining circuit.

Objects of the present invention may also be achieved with the use of a plurality of means for delaying signals combined with means for repetitively passing the signals through the delaying means for producing an output in response to the signals. In a preferred embodiment, each of the delaying means comprises the combination of a body of piezoelectric material, one or more input transducers and one or more output transducers. The piezoelectric material may have a planar surface with reflecting means at each end.

DESCRIPTION OF THE PREFERRED EMBODIMENTS

Figure 1:
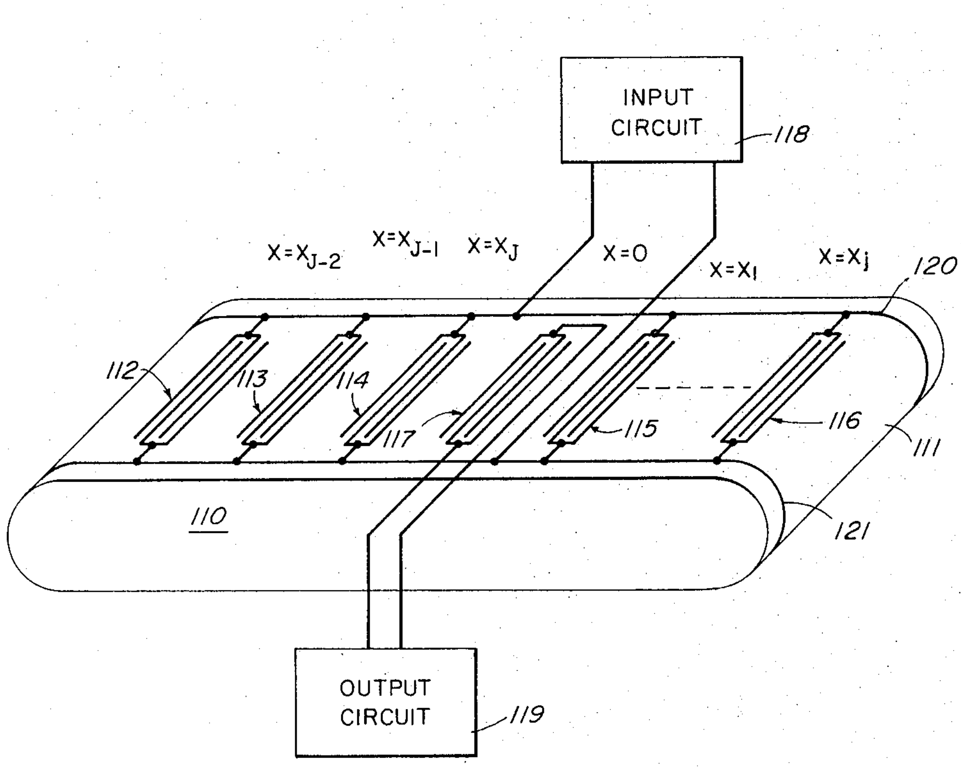
FIG. 1 is a perspective view of a device constructed in accordance with the present invention which uses a continuously curved surface piezoelectric substrate.

FIG. 1 shows a perspective view of a device constructed in accordance with the present invention where a number of acoustic wave transducers 112 through 116, constructed by well-known techniques, are mounted upon the surface 111 of a piezoelectric substrate 110 which has a curved surface upon which a surface wave may continuously circulate. For example, a wave launched at the transducer 115 at $x = x_1$ will propagate in both directions from the transducer 115, go around the surface 111 in both directions, passing under transducer 115. The wave will continue to do so until dissipated by the various attenuating factors. In the device shown in FIG. 1, there is a single receiving or output transducer 117 located at $x = 0$ on the top surface of the device while there are J transmitting or input transducers located at spaced locations $x = x_1$ through $x = x_J$ where $x$ is measured along the surface 111. The input transducers 112 through 114 and 115 and 116 are connected in parallel on lines 120 and 121 disposed upon the surface 111 of the piezoelectric substrate 110. These are then connected from lines 120 and 121 to input circuit 118, which preferably includes an amplifier to provide signal power to the device through all of the input transducers. The output transducer 117 is connected to the output circuit 119 which, for example, may be the feedback element in an oscillator.

Once a desired frequency response for a device has been determined, the appropriate location of the transducers may be approximately determined mathematically. If only the single input transducer 116 located at $x = x_J$ were to be excited by input circuit 118, the waveform received at output transducer 117 for the first passing of the wave front would be given by the expression:

$$\exp\{i2\pi f(t - x_J/v)\} + \exp\{i2\pi f[t + (L - x_J)/v]\}$$

where $f$ is the frequency of the waveform, $v$ is the velocity of wave propagation, and $L$ is the total distance around the surface of the piezoelectric substrate. At this point, the expression does not include the attenuation factors of the substrate or of the transducers. Each time the wave front from transducer 116 passes the output transducer 117, its amplitude is added to the amplitudes from previous passes. Hence, in steady state and disregarding attenuation the wave front as sensed at $x = 0$ by the transducer 117 will consist of the unbounded summation of these wave fronts as they pass the transducer propagating from both directions. Also, when the other input transducers are added to the surface of the acoustic wave device and connected in parallel, their effect must also be taken into account. Hence, disregarding attenuation factors, the form of the wave front as sensed at transducer 117 in the steady state when transducers located at $x = x_1$ through $x = x_J$ are excited will be:

$$\{[\sin \alpha(f-f_o)]/(f-f_o)\} \sum_{j=1}^{J} \sum_{n=-\infty}^{\infty} [\exp\{i2\pi f[t - (nL+x_j)/v]\} + \exp\{i2\pi f[t-(nL-x_j)/v]\}]$$

$n$, the index running from $-\infty$ to $+\infty$, accounts for propagation in both directions and the summation taken from $j = 1$ to $j = J$ accounts for contributions from the total of J input transducers. The factor $[\sin \alpha (f-f_c)]/(f-f_c)$ accounts for the frequency response of the transducers themselves, which are the well-known conductive finger or comb type transducers in the preferred embodiment. The frequency $f_c$ is the center frequency of the transducers determined by the finger spacing while the multiplicative factor $\alpha$ is a constant dependent upon the number of teeth in each of the combs in the transducer. This expression may be rearranged to the following where the time dependence is brought out of the summation.

$$[\exp\{i2\pi ft\}]\cdot[[\sin \alpha(f-f_o)]/(f-f_o)] \sum_{j=1}^{J} \sum_{n=-\infty}^{\infty} [\exp\{i2\pi f x_j/v\}]\cdot[\exp\{i2\pi nf/f_1\}]$$

where $f_1 = v/L$.

It is fruitful to examine this expression in some detail so as to extract therefrom a physical interpretation of the operation of the device. Since the two exponential terms within the summations are independent, they may be separated and the summations written as products of sums. The factor $$\sum_{n=-\infty}^{\infty} \exp\{i2\pi nf/f_1\}$$

may be written in the form $$f_1 \cdot \sum_{n=-\infty}^{\infty} \delta(f - nf_1)$$

where the delta function $\delta(f - nf_1)$ tends to infinity when the argument $(f - nf_1)$ is zero and is zero elsewhere. Hence, when $f$ is equal to integer multiples of $f_1$, the above sum tends to infinity while at values of $f$ other than integer multiples of $f_1$, the sum is zero. The derivation from exponential to delta form is demonstrated on pages 44 and 45 of *The Fourier Integral and Its Applications*, A. Papoulis, McGraw, 1962. In that reference $t$ is $f$ and $T( = 2\pi/\omega_0)$ is $f_1$ in the present discussion. Physically, the implications from the formula are that at values of $f$ which are integer multiples of $f_1$, the waveforms as received at the output transducer 117 are in phase and, hence, additive and are unbounded but for the attenuation of the substrate and transducers whereas at all other frequencies they are out of phase and tend to cancel one another.

Figure 2A:
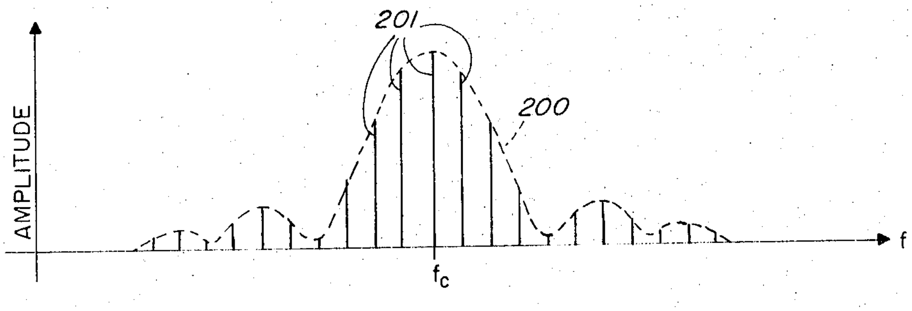
FIGS. 2A through 2D are a series of graphs showing the frequency selection properties of a device constructed in accordance with the present invention.

An example of the frequency response of the device is shown in FIG. 2A. There are a number of peaks 201 at frequencies spaced at multiples of $f_1$ around the center frequency $f_c$. The peak spacing $f_1$ is fixed by both $v$ and $L$ since $f_1 = v/L$. The amplitude of all of these peaks is multiplied by the envelope factor $$[\sin \alpha (f-f_c)]/(f-f_c)$$

The width of the peaks 201 is determined primarily by the characteristics of the individual transducers. In actuality, of course, the attenuation of a wave increases for each value of $n$ as for each increase in the value of $n$, the wave propagates around the surface one or more times with attendant attenuation.

Various peaks within the set of peaks shown in FIG. 2A may be eliminated by proper choice of the locations $x_j$ of the various transducers. In the limit, a single peak device may be made where all but the remaining peak has been cancelled. For example, in FIG. 2B half of the peaks that were present in FIG. 2A have been eliminated. This result may be achieved with a device as in FIG. 1 using a single output transducer and two input transducers. If the two input transducers are located at $x_1 = m\lambda_1/4$ and $x_2 = m\lambda_1/2$, where $\lambda_1 = v/f_1$, the response of the device (not including envelope and time factors) will be given by $$f_1 \cdot \sum_{n=0}^{\infty} [\exp\{i2\pi f m\lambda_1/4v\} + \exp\{i2\pi f m\lambda_1/2v\}] \cdot \delta(f - nf_1)$$

Because of the delta function, the expression will be zero for all values of $f$ other than integer multiples of $f_1$. Hence, this expression may be reduced to $$f_1 \cdot \sum_{n=0}^{\infty} [\exp\{i\pi mn/2\} + \exp\{i\pi mn\}] \cdot \delta(f - nf_1)$$

Figures 2B, 2C:
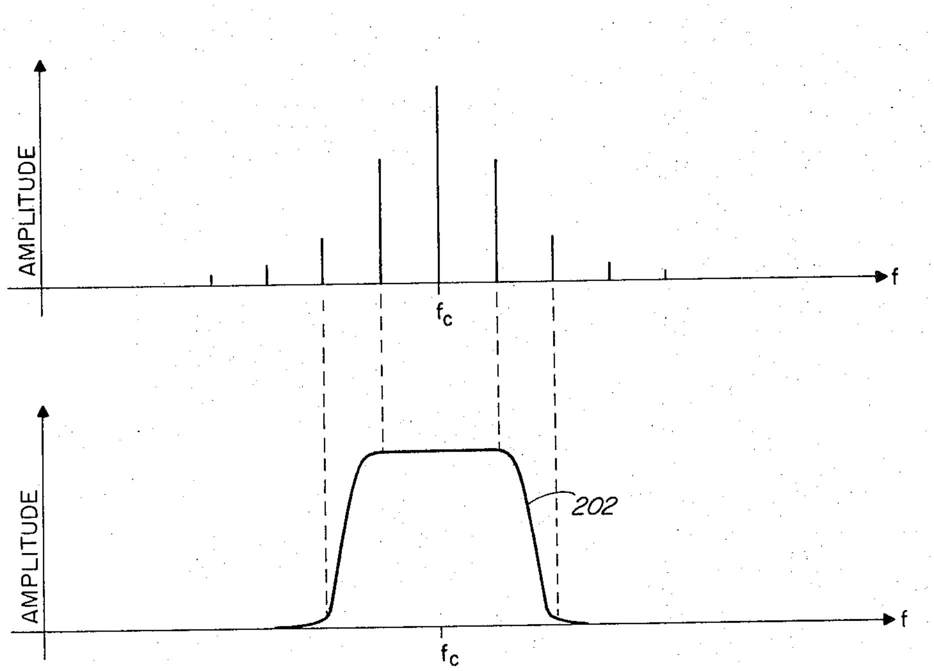

It is readily evident that $$\exp\{i\pi mn/2\} + \exp\{i\pi mn\} = 0$$

for all even values $n$ when $m$ is odd. Hence, if $m$, chosen to be an odd integer, that is, the transducer spacings are odd integer multiples of $\lambda_1/4$ and $\lambda_1/2$ respectively, all peaks at even multiples of $f_1$ will be eliminated. This case is illustrated in FIG. 2B.

Figure 2D:
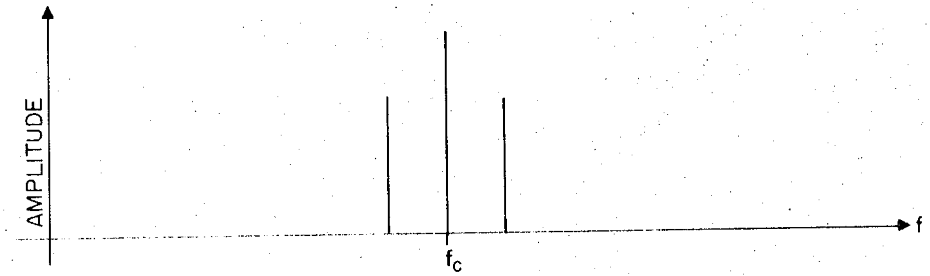

Other peaks can be eliminated by conventional filtering techniques using either active or passive filters which may be constructed by conventional techniques. For example, as shown in FIG. 2C, the bandpass response of a conventional bandpass filter is shown by the curve 202. This response curve 202 brackets the center peak at $f_c$ and the two peaks on either side of it thereby eliminating all peaks not within the passband. After being filtered by such a device, the overall response of the combination will be as shown in FIG. 2D where only three peaks remain. Of course, various combinations of these two filtering techniques may be used. For example, a bandpass filter with bandwidth greater than that of a peak 201 but less than $f_1$ may be used to select only a single peak. Overall tuning may then be accomplished by choosing a selected narrow peak with a relatively broad band tunable filter. The additional filtering as shown in FIG. 2C need not be used if the transducers are so arranged that there are no substantial peaks other than those of interest. Furthermore, the various transducers may be switched in and out of the circuit as required thereby making a filter in which the frequency peak may be selectively chosen by external switching means. Such a device will be explained in conjunction with FIG. 3.

Figure 3:
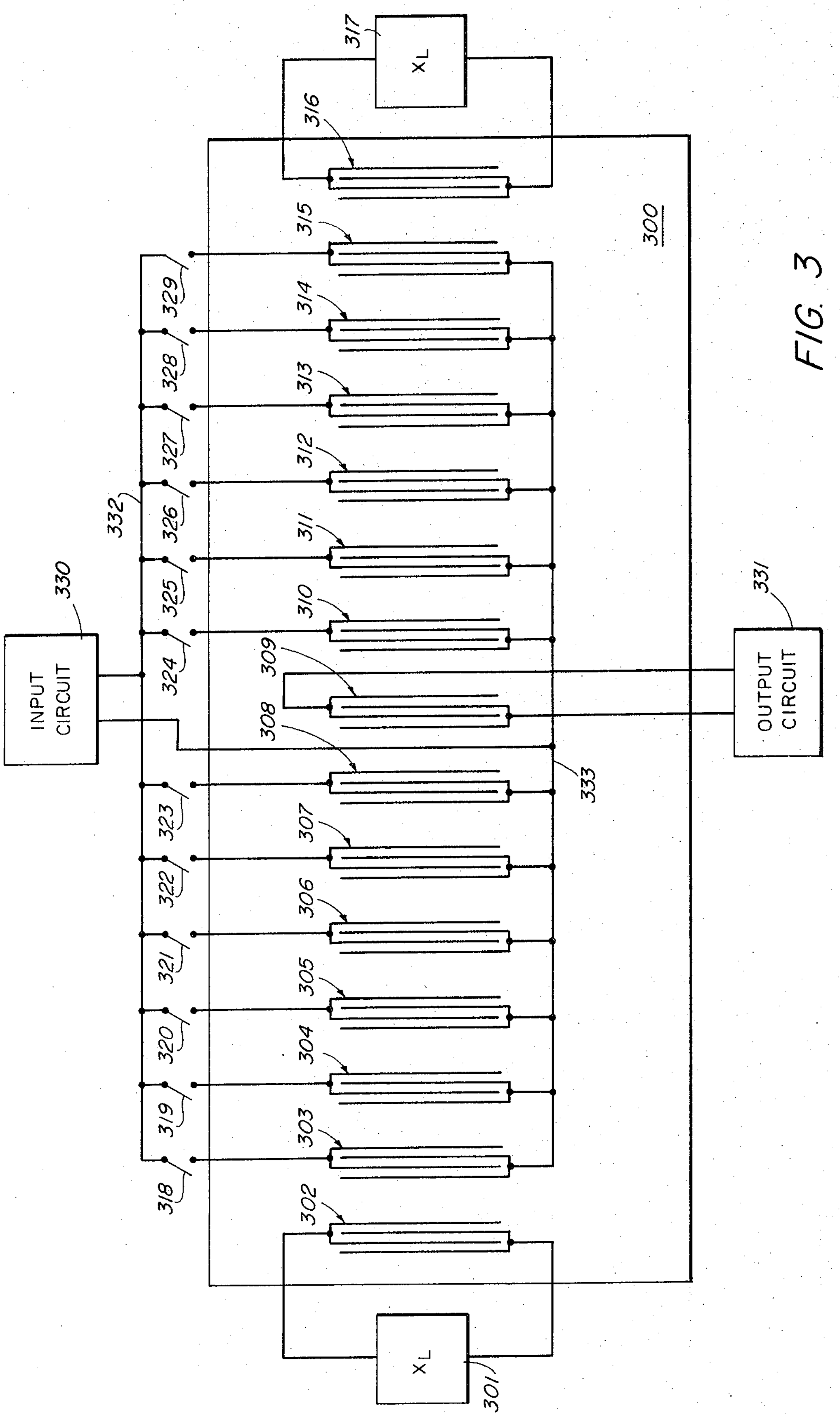
FIG. 3 is a plan view of a device constructed in accordance with the present invention which employs a planar piezoelectric substrate and which has the capability of switchably choosing the frequency at which the device is to operate.

FIG. 3 shows a planar surface wave device which operates similar to the device shown in FIG. 1 except that the waves are reflected at the ends of the device rather than being able to propagate around the device. In this device, a wave launched from any one of the input transducers 303–308 and 310–315 propagates outwards to the two transducers 302 and 316 located at the ends of the device. When the wave strikes either of these transducers it will be substantially totally reflected. The reflection is accomplished by the well-known technique of terminating transducers 302 and 316 in load impedances 301 and 317 respectively which cancel the reactive portion of the impedance of the transducer. Hence, the overall characteristics are nearly the same as with the device shown in FIG. 1 in that waves continuously propagate back and forth until they are finally attenuated. The device shown in FIG. 3 has the additional advantages in that it may be fabricated by well-known planar techniques including methods for forming the transducers using photolithographic processes.

In the device shown in FIG. 3, the transducers 302–316 are all disposed upon the surface of the substrate 300 which, in the preferred embodiment, may be lithium niobate or quartz. The two terminal input transducers 303–308 and 310–315 have one terminal connected to the common line 333. The other terminal of each is connected through one of switches 318–329 to second common line 332. Both common lines 332 and 333 are then connected to the input circuit 330. The output transducer 309 has both terminals connected directly to the output circuit 331. Of course, in this embodiment as well as in the embodiment of the device shown in FIG. 1, the input circuit 330 and the output circuit 331 may be reversed and yet the same overall frequency response characteristics of the device will be retained. Furthermore, it may be desirable in some embodiments to use both a plurality of input transducers and a plurality of output transducers and to intermingle these upon the surface of the substrate 300 so as to produce any desired arrangement of frequency response peaks. The switches 318–329 may be set as desired to produce the desired arrangement of frequency response peaks. It is also possible to switchably connect other ones of the transducers to the load impedances 301 and 317 to vary the spacing between peaks by varying the effective total length of the substrate.

Figure 4:
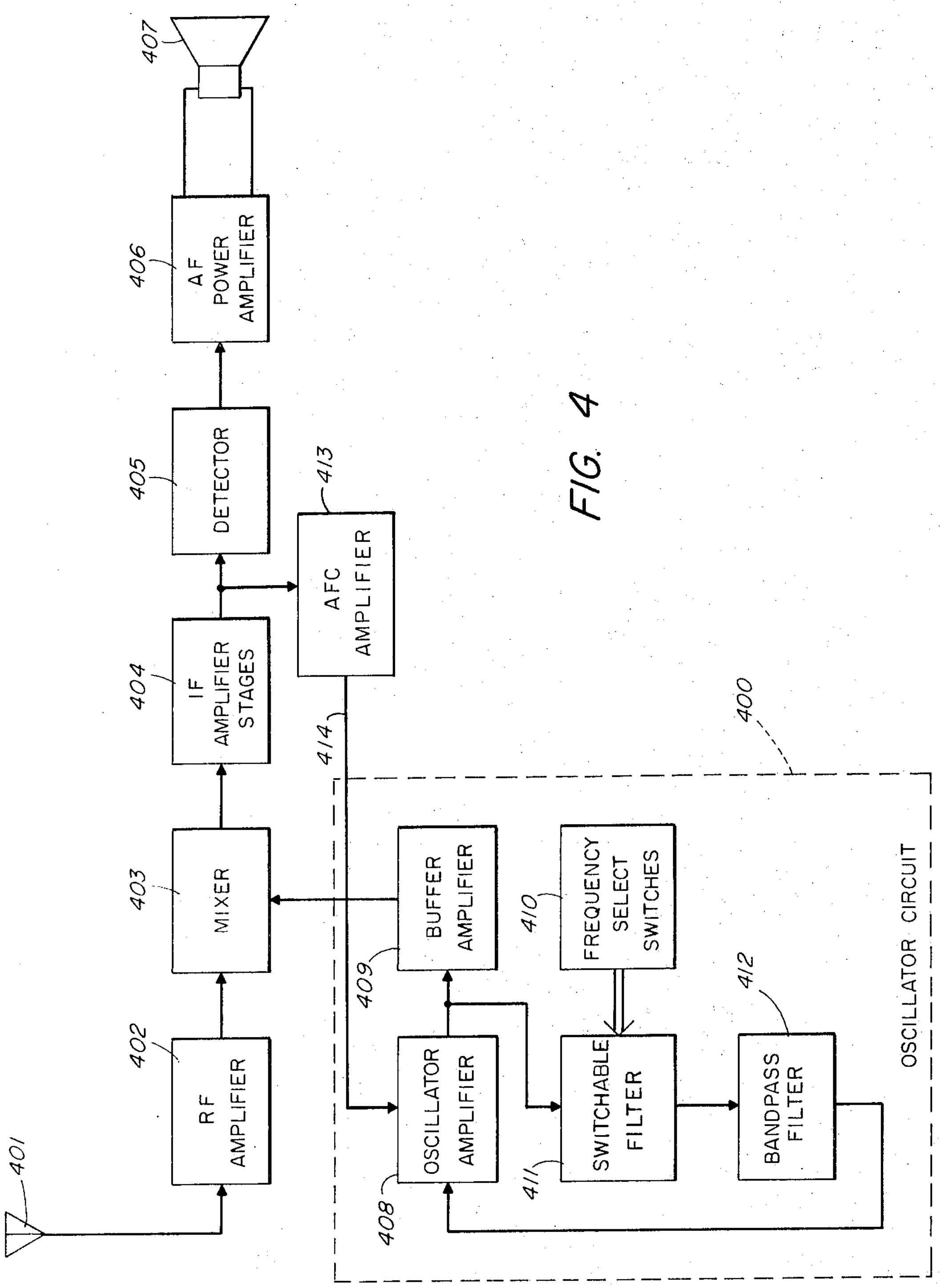
FIG. 4 is a block diagram of a receiver in which the present invention is used as a switchable frequency selection device.

In FIG. 4, the switchable filter of FIG. 3 is shown in the block diagram of a superheterodyne receiver where the received frequency is set by a set of external operator controlled switches. Such a system is particularly desirable, for example, in a marine type radio where there are numbers of evenly spaced assigned frequencies where it is desirable to be able to switch quickly to any one frequency. The present invention is particularly advantageous in that it does not require a separate crystal or other frequency selective element for each frequency to be received. Such an arrangement may also be used in a television tuner.

In the receiver shown in FIG. 4, the received signal is intercepted by antenna 401 which is coupled to RF amplifier 402. The signal output from RF amplifier 402 is beat with the output of oscillator circuit 400 by mixer 403. The present invention is used to advantage within the oscillator circuit 400.

The switchable filter 411 is a device as shown in FIG. 3 where the transducers may be switched in and out of the circuit so as desired to produce the selected frequency of the circuit. The number and location of the transducers is preselected to meet the requirements of the desired band of operation of the receiver. In this receiver, the frequency select switches 410 are set by the operator for the desired frequency from switchable filter 411. The output of switchable filter 411 is coupled in a feedback loop through bandpass filter 412 to the oscillator amplifier 408. The bandpass filter 412 is used to eliminate those peaks outside of the range of interest which would interfere with the operation of the oscillator circuit 400 and which may not be required in all such circuits. The oscillator amplifier output is fed back to the input of the switchable filter 411 thus closing the feedback loop. The phase shift across the oscillator amplifier 408 is chosen such that there will be a full 360° phase shift through the loop so that the circuit will oscillate. The buffer amplifier 409 couples the output of the oscillator amplifier 408 to the mixer 403 without disturbing the internal circuit impedances.

The remainder of the receiver circuit is conventional. The IF amplifier stages 404 amplify the signal at IF frequencies and couple the amplified signal to detector 405. Automatic frequency control amplifier 413 produces a voltage on line 414 related to the strength of the received signal. That voltage is used to control a voltage controlled reactive element, such as a varactor diode, in oscillator amplifier 408 which automatically corrects for any frequency drift. The detected output is then amplified by AF power amplifier 406 and coupled to loudspeaker 407. Of course, many different circuit arrangements could be used for the receiver as well as for the oscillator circuit 400 within it as FIG. 4 is an illustration of only one possible arrangement. Also, the oscillator circuit 400 and its equivalents could as well be used to set the frequency of transmission in a transmitter circuit or, could be used to set both transmitting and receiving frequencies in a transceiver as is commonly employed at the marine frequencies or in the Citizens Band and mobile VHF frequencies. The device may also be used to advantage in the tuning circuits of television equipment, including cable television equipment.

Although specific embodiments of the invention have been disclosed, numerous modifications and alterations would be apparent to one skilled in the art without departing from the spirit and scope of the present invention. Other shapes for the surface wave device may be used other than those shown in FIGS. 1 and 3 or bulk wave devices may be used instead. Temperature compensation may also be added to the devices using well-known temperature compensation techniques.

What is claimed is:

1. In combination:

a piezoelectric body having at least one planar surface capable of sustaining surface wave propagation thereon;

a plurality of input transducers located upon said surface;

one or more output transducers located upon said surface;

means for reflecting surface waves located at each end of said surface, said input transducers and said output transducers being located between said reflecting means; and a plurality of switch means coupled to said input transducers, said switch means being operable to couple ones of said input transducers to input circuit means to produce surface waves which are substantially in phase with one another at said output transducers at a preferred frequency and to uncouple other ones of said input transducers.

2. In combination:

a piezoelectric body having at least one surface capable of sustaining surface wave propagation thereon, the path of propagation of said surface waves on said surface being continuous for said surface waves to circulate thereon;

one or more input transducers located upon said surface;

a plurality of output transducers located upon said surface; and a plurality of switch means coupled to said output transducers, said switch means being operable to couple ones of said output transducers to output circuit means for surface waves which are substantially in phase with one another at a preferred frequency and to uncouple other ones of said output transducers.

3. In combination:

a piezoelectric body having at least one surface capable of sustaining surface wave propagation thereon, the path of propagation of said surface waves on said surface being continuous for said surface waves to circulate thereon;

a plurality of input transducers located upon said surface;

one or more output transducers located upon said surface; and a plurality of switch means coupled to said input transducers, said switch means being operable to couple one of said input transducers to input circuit means to produce surface waves which are substantially in phase with one another at said output transducers at a preferred frequency and to uncouple other ones of said input transducers.

4. A frequency determining circuit comprising:

a body of piezoelectric material, said body having at least one surface upon which surface waves may repetitively propagate;

one or more input transducer means located upon said surface;

one or more output transducer means located upon said surface, said input transducer means and said output transducer means being positioned relative to one another so that signals of other than a selected frequency are substantially cancelled between said input transducer means and said output transducer means;

amplifier means connected between said input transducers and said output transducers, an input of said amplifier means being coupled to said output transducers and an output of said amplifier means being coupled to said input transducers; and switch means coupled to said amplifier means for selecting said frequency.

5. In combination:

means for repetitively propagating waves over a predetermined range of frequencies;

three or more transducer means coupled to said propagating means;

input circuit means coupled to one or more of said transducers;

output circuit means coupled to one or more other ones of said transducers; and switch means coupled to at least some of said transducer means, said switch means being operable to select one or more frequencies of waves to be coupled between said input circuit means and said output circuit means, waves of other than said selected frequency being substantially cancelled.

6. The combination of claim 5 wherein said propagating means comprises piezoelectric material and said waves comprise surface waves.

7. The combination of claim 6 further comprising utilization means in an oscillator, said utilization means comprising means for coupling signals between said output circuit means and said input circuit means.

8. The combination of claim 7 wherein said means for coupling signals between said output circuit means and said input circuit means comprises amplifying means.

9. The combination of claim 8 further comprising bandpass filter means coupled to said amplifier means.

10. The combination of claim 8 further comprising means for mixing an output of said amplifying means with a received signal.

11. The combination of claim 10 further comprising utilization means in a receiver.

12. An oscillator with a preferred oscillating frequency selected by switches comprising in combination:

a substrate of piezoelectric material;

a plurality of input and output transducers coupled to said piezoelectric substrate;

a plurality of switch means coupled to said transducers, said switch means being operable to alternatively connect and disconnect said transducers from each other, waves of said preferred oscillating frequency being coupled through connected ones of said transducers; and amplifying means, an input of said amplifying means being coupled to said output transducers and an output of said amplifying means being coupled to said input transducers.

13. In combination:

a piezoelectric body having at least one planar surface capable of sustaining surface wave propagation thereon;

one or more input transducers located upon said surface;

a plurality of output transducers located upon said surface;

means for reflecting surface waves located at each end of said surface, said input transducers and said output transducers being located between said reflecting means; and a plurality of switch means coupled to said output transducers, said switch means being operable to couple ones of said output transducers to output circuit means for surface waves which are substantially in phase with one another at a preferred frequency and to uncouple other ones of said output transducers.

* * * * *